L. SIMPSON.
TRUCK.
APPLICATION FILED MAY 10, 1915.
1,180,327.
Patented Apr. 25, 1916.
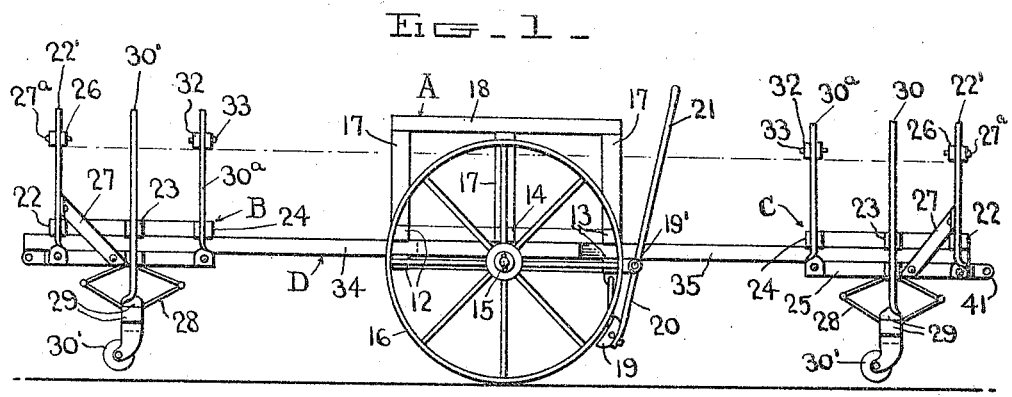
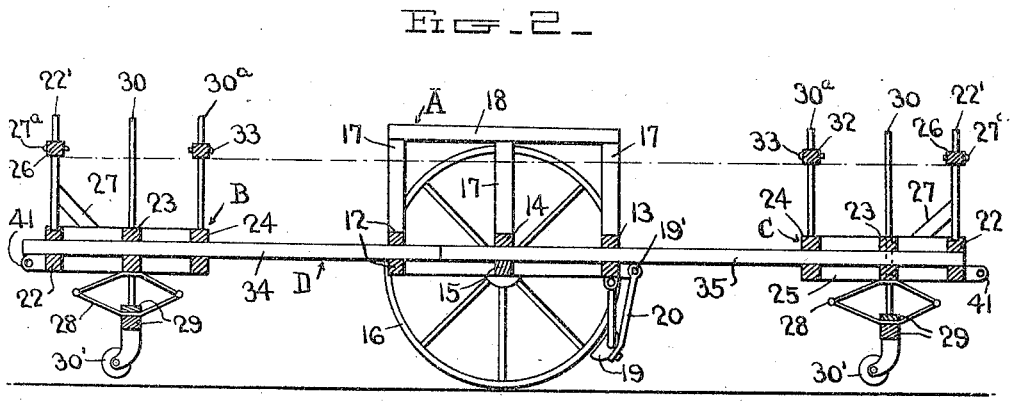
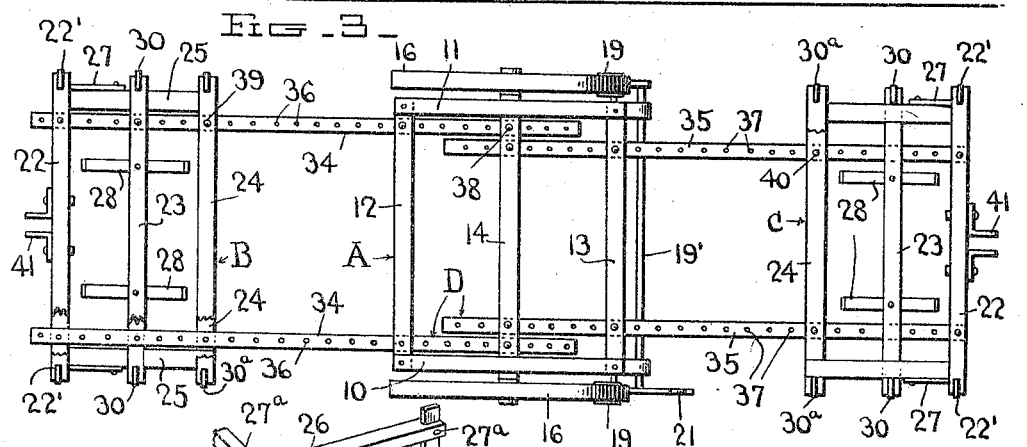
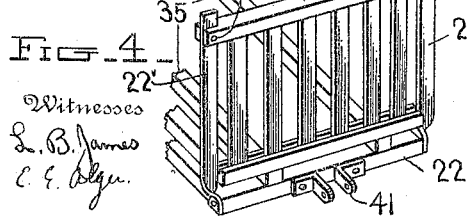

UNITED STATES PATENT OFFICE.

LOUIS SIMPSON, OF FORT WORTH, TEXAS.

TRUCK.

1,180,327.  Specification of Letters Patent.  Patented Apr. 25, 1916.

Application filed May 10, 1915. Serial No. 27,196.

*To all whom it may concern:*

Be it known that I, LOUIS SIMPSON, a citizen of the United States, residing at Fort Worth, in the county of Tarrant and State of Texas, have invented certain new and useful Improvements in Trucks, of which the following is a specification.

This invention relates to trucks.

One oject is to provide an extensible truck particularly adapted for the transportation of lumber in lumber yards, and for the transfer of lumber, steel rails, beams or the like from boats to landings or vice versa.

Another object resides in the provision of a truck embodying among other characteristics two end truck members adjustably spaced from and supported by an intermediate truck member which may form a pivot or fulcrum for the truck to provide for an easy and ready turning of the truck, and which intermediate truck member is so associated with the end truck members that the weight of the load is sustained by the intermediate truck member.

A still further object is to provide a comparatively simple, inexpensive, durable and efficient extensible truck embodying among other characteristics, means whereby the load may be firmly bound on the end members of the truck so that the truck and the load carried thereby may constitute substantially a rigid mass, whereby the load may be expeditiously transported from place to place.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 is a side elevation of the invention. Fig. 2 is a longitudinal sectional view. Fig. 3 is a top plan view. Fig. 4 is a perspective view of one of the end gates.

Referring now more particularly to the accompanying drawings, the reference character A indicates the intermediate member of the truck, and B and C the end members of the truck, all coupled together by means of suitable coupling poles D.

The end truck members B and C are formed alike but the intermediate member A is constructed differently from the end members B and C and is adapted to sustain most of the weight of the materials placed on the conveyance, as will be hereinafter explained. This intermediate member A of the truck embodies side sills 10 and 11 and front and rear pairs of transverse sills 12 and 13 connected to the side sills 10 and 11. The transverse sills of each front and rear pair thereof are arranged in superimposed spaced relation, being connected one on top and one to the under side of the side sills 10 and 11 so that the coupling poles D may be passed between the cross sills of each pair 12 and 13 for a purpose presently explained.

The character 14 indicates an intermediate cross sill of the truck member A which lies directly over the axle 15 in spaced relation to the latter, and which is disposed in horizontal alinement with the uppermost of the pairs of sills 12 and 13 thereof, with the axle 15 arranged in horizontal alinement with the lowermost of the pairs of sills 12 and 13.

Relatively large wheels 16 are journaled on and secured to the ends of the axle 15 in any suitable manner and standards 17 are connected to the ends of the uppermost of the pairs of sills 12 and 13 and to the sill 14 to prevent sidewise displacement of lumber, rails or other freight being transported on the truck and, if desired, the uprights 17 on each side of the truck member A may be connected at their upper ends by a connecting piece 18.

Brake shoes 19 may be suspended from a rock-shaft 19' mounted by brackets 20 and operated by a lever 21 or by any other suitable means. As a matter of fact, any suitable braking mechanism may be employed.

As the end members B and C of the truck are each formed alike, a detailed description of one is sufficient. Each end member of the truck has its body composed of three pairs of transverse sills 22, 23 and 24 connected at their ends by the side sills 25 of the end members of the truck. These pairs of transverse sills are spaced in the same manner that the pairs of sills 12 and 13 are spaced so as to receive between the uppermost and lowermost pieces of each pair the aforesaid coupling poles D. The coupling poles D preferably suspend the end truck members slightly off the ground or floor, as shown in Figs. 1 and 2.

An end gate 26 is removably supported on the outermost pair of standards 22′ of the end members of the truck and these end gates 26 may be slidably supported on the standards 22′, as shown. The standards 22′ are preferably braced by the braces 27 and, if desired, the end gates may be locked in position by suitable pins 27$^a$.

Springs 28 are carried by the end truck members and arranged between the intermediate pair of cross sills 23 and a pair of slightly spaced sills 29 between which latter the springs 28 are secured and which sills 29 are rigidly connected to the standards 30 carrying the caster wheels 30′. The intermediate pair of sills 23 of each end member of the truck are bifurcated as at 23′ so that the intermediate cross sills 23 may have sliding movement vertically on the standards 30 incident to the expansion and compression of the springs 28.

Standards 30$^a$ are secured to the inner ends of the end truck members and provided with apertures and a cross bar 32 is adapted to connect the opposite standards 30$^a$ of each end truck member, the cross piece being preferably bifurcated and perforated so that a pin or other suitable fastening 33 may be passed through the cross pieces 32 and through the standards 30$^a$ for the purpose of clamping the lumber, rails or other material tightly on the end truck members adjustably according to the height of the load.

The coupling poles D may be arranged in pairs 34 and 35, each pair having a plurality of apertures 36 and 37, respectively, adapted to be brought into registration with a plurality of apertures 38, 39 and 40 formed respectively in the intermediate and end truck members A, B and C to receive fastening pins $a$ or the like so that the end members of the truck may be disposed and secured at different spaces from the intermediate truck member A, thereby providing for an extension or adjustment of the truck for the accommodation of lumber, rails or other materials of various lengths, particularly to balance the load on the center wheels, requiring less power to move the truck. Either end truck can be coupled a longer or shorter distance from the center truck than the other end truck so that if one end is heavier than the other, the truck can be balanced on the wheels of the intermediate truck.

The cross pieces 32 serve to brace the standards 30$^a$ and they also perform the function of binding the load on the end members of the truck. By virtue of these bracing and binding cross pieces 32 and the manner in which the supporting members of the truck are coupled together by the coupling poles D, the load and truck are so bound together as to constitute one rigid mass balanced on the large wheels of the intermediate truck member A, whereby these large wheels of the intermediate truck member A form a pivot or fulcrum, permitting the whole truck to be turned around in a space substantially no larger than the length of the load. This is a decided advantage in loading lumber on to or off the trucks in the narrow alleys of lumber yards and is particularly advantageous in storing lumber in the second story of lumber yards, saving considerable time and, when stacking lumber to the height of ten feet, as much lumber can be stacked in a given time by one man as is now accomplished by two men. However, my improved truck is particularly serviceable in loading barges and boats with lumber and other material, such as steel rails, steel beams, etc. By mounting the removable end gates 36 and binding the load on the end members of the truck through the instrumentality of the said bracing and binding cross pieces 32, the truck may be easily and readily lowered down an inclined gang plank, way or the like on to a boat and, on account of the possibility of pivoting the truck on the large wheels of the center or intermediate truck member A, the load can be turned and moved back on the boat end ways either backward or forward. The custom now employed for handling lumber, beams, rails or the like on river boats is expensive because the deck hands carry one or two pieces at a time on their shoulders. This is exceedingly laborious and very slow. My improved extension truck enables the lumber to be loaded aboard the boat, pulled up an inclined way off the boat and then horses may be attached to the truck, at either end thereof as, for instance, by a connection with the clevis or the like 41 on each end truck member, and the truck with the freight thereon moved any distance without unloading until the place of stacking is reached. This saves carrying the lumber on the shoulders of men to the wharf where the lumber is picked up by teamsters, loaded on wagons and hauled to the lumber yards and stacked. In the use of my improved truck the material may be taken directly from the boat to the place of stacking or other place desired to transport the same.

What is claimed is:—

1. In an extension truck, an intermediate wheeled truck member, end wheeled truck members, coupling poles to adjustably connect the truck members together and slightly elevate the end truck members off the ground, and means whereby the load may be bound tightly on the end truck members so that the load and truck members may be rigidly connected together and the weight of the load sustained by the intermediate truck member.

2. A truck comprising an intermediate member, end members, coupling poles adjustably connecting the end truck members to the intermediate member and maintaining the end members slightly elevated off the ground, and means to bind the load on the end truck members to cause the weight of the load to be sustained by the intermediate truck member.

3. A truck comprising an intermediate wheeled member, end wheeled members, coupling poles adjustably connecting the end truck members to the intermediate truck member, means to bind the material on the end trucks to cause the weight of the load of material to be sustained by the intermediate truck member, and end gates detachably connected to the end truck members.

4. A truck comprising an intermediate truck member, end truck members, coupling poles adjustably connecting the end truck members to the intermediate truck member so that the end truck members may be balanced on the intermediate truck member as a fulcrum, and means to bind the load on the end trucks to render the truck and load rigid and cause the weight of the load to be sustained by the intermediate truck member.

5. A truck comprising an intermediate truck member, end truck members, a coupling connection between the truck members, the supporting portion of the end truck members being yieldably mounted so as to yield automatically under pressure upon striking an elevation and the supporting portion of the intermediate member being rigidly mounted so as to sustain substantially all of the weight of the load on the truck during travel over even or uneven surfaces and whereby the truck may be easily turned on the intermediate truck member acting as a fulcrum.

6. A truck comprising an intermediate truck member, end truck members, a coupling connection between the truck members, the supporting portion of the end truck members being yieldably mounted so as to yield automatically under pressure upon the end truck striking an elevation and the supporting portion of the intermediate member being rigidly mounted, so as to sustain substantially all of the weight of the load on the truck when the latter is moved over even or uneven surfaces, and cross pieces on the end trucks to bind the load on the end trucks.

7. A truck comprising an intermediate wheeled member, end wheeled members, coupling poles connecting the end wheeled members to the intermediate wheeled member and maintaining the end wheeled members slightly elevated off the ground, and means to bind the load on the end trucks to cause substantially all of the weight of the load to be normally sustained by the intermediate truck to facilitate movement and turning of the truck, the supporting portion of the intermediate truck being rigid and the supporting portions of the end trucks being yieldable so as to give automatically under pressure upon striking an elevation and thereby permit the main part of the weight of the load to be sustained by the intermediate truck during movement of the truck over even or uneven surfaces.

In testimony whereof I affix my signature in presence of two witnesses.

LOUIS SIMPSON.

Witnesses:
J. H. ARMSTRONG,
C. E. BEORUS.

Copies of this patent may be obtained for five cents each, by addressing the "Commissioner of Patents, Washington, D. C."